(12) United States Patent
Omori

(10) Patent No.: US 9,619,194 B2
(45) Date of Patent: Apr. 11, 2017

(54) METHOD FOR SEARCHING FOR IMAGE FORMING APPARATUS, MOBILE TERMINAL, AND NON-TRANSITORY COMPUTER READABLE MEDIUM

(71) Applicant: FUJI XEROX CO., LTD., Tokyo (JP)

(72) Inventor: Satoshi Omori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/818,446

(22) Filed: Aug. 5, 2015

(65) Prior Publication Data
US 2016/0283180 A1   Sep. 29, 2016

(30) Foreign Application Priority Data

Mar. 27, 2015   (JP) ................................ 2015-067556

(51) Int. Cl.
*G06F 3/12*   (2006.01)
(52) U.S. Cl.
CPC .......... *G06F 3/1292* (2013.01); *G06F 3/1205* (2013.01); *G06F 3/1236* (2013.01)
(58) Field of Classification Search
USPC ....................................................... 358/1.15
See application file for complete search history.

(56) References Cited

U.S. PATENT DOCUMENTS

| 2011/0194138 A1* | 8/2011 | Seo | H04N 1/00204 358/1.15 |
|---|---|---|---|
| 2013/0201515 A1* | 8/2013 | Daos | H04N 1/00095 358/1.15 |
| 2014/0006633 A1* | 1/2014 | Uchikawa | H04W 76/02 709/227 |
| 2014/0118778 A1* | 5/2014 | Lee | H04N 1/00127 358/1.15 |
| 2014/0240774 A1 | 8/2014 | Suzuki | |
| 2014/0378112 A1* | 12/2014 | Sugimoto | H04B 5/0031 455/418 |
| 2015/0021845 A1* | 1/2015 | Kitamura | G03G 15/6544 270/1.01 |

FOREIGN PATENT DOCUMENTS

| JP | 2013-115828 A | 6/2013 |
| JP | 2014-168213 A | 9/2014 |

* cited by examiner

*Primary Examiner* — Ngon Nguyen
(74) *Attorney, Agent, or Firm* — Sughrue Mion, PLLC

(57) ABSTRACT

A method for searching for an image forming apparatus includes a first search method for searching for an image forming apparatus that is connected to a mobile terminal via a relay device for wireless connection, and a second search method for searching for an image forming apparatus that is wirelessly connectable to the mobile terminal without involving the relay device. The method includes executing a search using at least the first search method among the first search method and the second search method in a case where the mobile terminal and the relay device are wirelessly connected to each other, and executing a search using the second search method in a case where the mobile terminal and the relay device are not wirelessly connected to each other, in order to search for an image forming apparatus.

13 Claims, 8 Drawing Sheets

METHOD FOR SEARCHING FOR IMAGE FORMING APPARATUS, MOBILE TERMINAL, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-067556 filed Mar. 27, 2015.

BACKGROUND

Technical Field

The present invention relates to a method for searching for an image forming apparatus, a mobile terminal, and a non-transitory computer readable medium.

SUMMARY

According to an aspect of the invention, there is provided a method for searching for an image forming apparatus, including a first search method for searching for an image forming apparatus that is connected to a mobile terminal via a relay device for wireless connection, and a second search method for searching for an image forming apparatus that is wirelessly connectable to the mobile terminal without involving the relay device. The method includes executing a search using at least the first search method among the first search method and the second search method in a case where the mobile terminal and the relay device are wirelessly connected to each other, and executing a search using the second search method in a case where the mobile terminal and the relay device are not wirelessly connected to each other, in order to search for an image forming apparatus.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described in detail with reference to the attached drawings.

System Configuration

Figure 1:
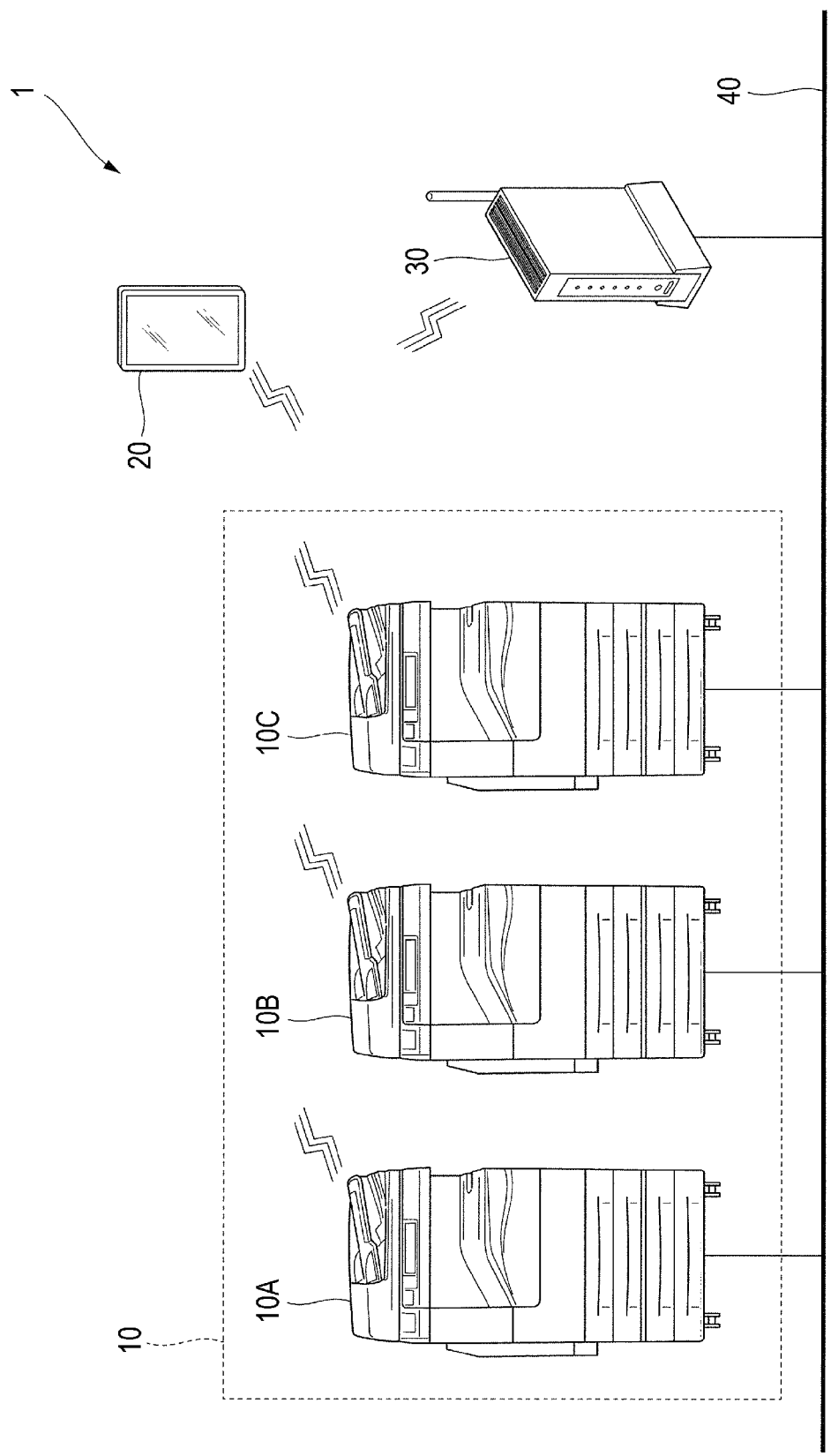
FIG. 1 is a diagram illustrating an example of the overall configuration of an image processing system according to the exemplary embodiment.

First, the overall configuration of an image processing system 1 according to the exemplary embodiment will be described. FIG. 1 is a diagram illustrating an example of the overall configuration of the image processing system 1 according to the exemplary embodiment. As illustrated in FIG. 1, the image processing system 1 includes image forming apparatuses 10A, 10B, and 10C, each having a function of forming an image; a mobile terminal 20, which is a mobile computer apparatus; and a wireless router 30 having a function of relaying communication between apparatuses in a wireless manner. The image forming apparatuses 10A, 10B, and 10C and the wireless router 30 are connected to a network 40 and communicate with one another via the network 40.

Each of the image forming apparatuses 10A, 10B, and 10C illustrated in FIG. 1 may be referred to as an image forming apparatus 10 in a case where it is not necessary to distinguish these apparatuses from one another. The three image forming apparatuses 10 are illustrated in FIG. 1, but four or more image forming apparatuses 10 may be provided.

The image forming apparatus 10 is, for example, an apparatus having a print function, a scan function, a copy function, a facsimile function, and so forth, which forms an image on a recording medium such as paper and outputs it. Here, the image forming apparatus 10 receives a print job from the mobile terminal 20 and performs print processing in accordance with the received print job. The print job includes image data as a target to be printed and a control instruction in which a setting of print processing is described, and is data serving as a unit of print processing performed by the image forming apparatus 10. The image forming apparatus 10 is compatible with the wireless local area network (LAN) standard of Wi-Fi (Wireless Fidelity, registered trademark), and is capable of wireless communication.

The mobile terminal 20 is a mobile computer apparatus that is used to provide instructions to implement various functions of the image forming apparatus 10. The mobile terminal 20 is compatible with the wireless LAN standard of Wi-Fi and is capable of wireless communication. The mobile terminal 20 operates application software for instructing the image forming apparatus 10 to print a document (hereinafter referred to as a print application) and transmits a print job to the image forming apparatus 10 by wireless communication. Examples of the mobile terminal 20 include a smartphone, a mobile phone, a tablet personal computer (PC), and a notebook PC.

Here, the mobile terminal 20 has a function of searching, by using a discovery protocol such as Bonjour (registered trademark), for an image forming apparatus 10 available to the mobile terminal 20. The discovery protocol is used to detect an image forming apparatus 10 that belongs to the same subnetwork as that of the mobile terminal 20 or a different subnetwork from that of the mobile terminal 20 and that is capable of communicating with the mobile terminal 20. The mobile terminal 20 makes a search request by using the discovery protocol, detects one or more available image forming apparatuses 10 in accordance with a response to the search request from the one or more image forming apparatuses 10, and displays a list of the image forming apparatuses 10 on a screen.

In the exemplary embodiment, a description will be given by using Bonjour as an example of the discovery protocol, but any other discovery protocols for searching for an image forming apparatus 10 capable of performing communication may be used. In the exemplary embodiment, a Bonjour search is used as an example of a first search method.

The mobile terminal 20 is also compatible with the standard of Wi-Fi Direct. Wi-Fi Direct is a standard in which Wi-Fi terminals are directly connected to each other and communicate with each other even in an environment without a relay device such as the wireless router 30. An apparatus compatible with Wi-Fi Direct has a function of operating as an access point that relays wireless communication between apparatuses. That is, the mobile terminal 20 is capable of functioning as an access point by using Wi-Fi Direct and performing direct wireless communication with an image forming apparatus 10 without involving a relay device such as the wireless router 30.

To establish a Wi-Fi Direct connection, the mobile terminal 20 searches for a neighboring image forming apparatus 10 that exists within the range of radio waves (hereinafter referred to as a neighbor search). The mobile terminal 20 then establishes a Wi-Fi Direct connection to the image forming apparatus 10 detected through the neighbor search and performs wireless communication. In the case of establishing a Wi-Fi Direct connection to the image forming apparatus 10, the mobile terminal 20 transmits a connection request to the image forming apparatus 10 to make a connection request. If the connection is permitted, a Wi-Fi Direct connection is established between the mobile terminal 20 and the image forming apparatus 10.

As a procedure of permitting a Wi-Fi Direct connection, there is a PIN code scheme in which a PIN code displayed on the image forming apparatus 10 on a receiver side of a connection request is input to the mobile terminal 20. Also, there is a push button scheme in which the image forming apparatus 10 on a receiver side of a connection request performs an operation of accepting the request. In the exemplary embodiment, a neighbor search based on Wi-Fi Direct is used as an example of a second search method.

The wireless router 30 is a relay device having a function of relaying wireless communication between apparatuses. The wireless router 30 holds information that is used to make a setting of wireless communication (hereinafter referred to as wireless communication). For example, to enable wireless communication between the mobile terminal 20 and the wireless router 30, the user may set the wireless information held by the wireless router 30 to the mobile terminal 20. Typically, wireless information is information unique to the relay device such as the wireless router 30. For example, Service Set Identifier (SSID), which is an identifier for identifying the relay device, an encryption key (password), or the like is used as wireless information. In the exemplary embodiment, the wireless router 30 is used as an example of a relay device for wireless connection.

The network 40 is a communication medium that is used for information communication between the image forming apparatus 10 and the wireless router 30, and is, for example, a wired LAN. When the user sets wireless information to the mobile terminal 20 and a wireless connection between the mobile terminal 20 and the wireless router 30 is established, the mobile terminal 20 becomes capable of communicating with the image forming apparatus 10 via the wireless router 30 and the network 40. If the mobile terminal 20 makes a search request by executing a Bonjour search in this state, one or more image forming apparatuses 10 that respond to the search request are detected as available apparatuses, and information representing the image forming apparatuses 10 is displayed on the screen of the mobile terminal 20.

In this way, in the exemplary embodiment, the mobile terminal 20 communicates with the image forming apparatus 10 via the wireless router 30 in some cases, and directly communicates with the image forming apparatus 10 by Wi-Fi Direct without involving the wireless router 30 in other cases. When a wireless connection is established between the mobile terminal 20 and the wireless router 30 and communication between the mobile terminal 20 and the image forming apparatus 10 via the wireless router 30 becomes possible, the mobile terminal 20 may execute a Bonjour search to detect the image forming apparatus 10 capable of communicating with the mobile terminal 20. If the mobile terminal 20 executes a neighbor search based on Wi-Fi Direct, an image forming apparatus 10 that exists near the mobile terminal 20 at the time and that is capable of establishing a Wi-Fi Direct connection is detected.

Hereinafter, a connection for wireless communication established between the mobile terminal 20 and the wireless router 30 may be referred to as a Wi-Fi connection. A connection for wireless communication directly established by Wi-Fi Direct between the mobile terminal 20 and the image forming apparatus 10 may be referred to as a Wi-Fi Direct connection. In the exemplary embodiment, a Wi-Fi connection is used as an example of a first connection, and a Wi-Fi Direct connection is used as an example of a second connection.

In the exemplary embodiment, a description will be given by using a Wi-Fi Direct connection as an example of a connection for wireless communication that is different from a Wi-Fi connection. However, any other connection for wireless communication that is different from a Wi-Fi connection may be used instead of the Wi-Fi Direct connection.

In the exemplary embodiment, a description will be given under the assumption that the network 40 is constituted by a wired network as illustrated in FIG. 1. Alternatively, communication between the image forming apparatus 10 and the wireless router 30 may be wirelessly performed, and the network 40 may be constituted by a wireless network.

Hardware Configuration of Image Forming Apparatus

Figure 2:
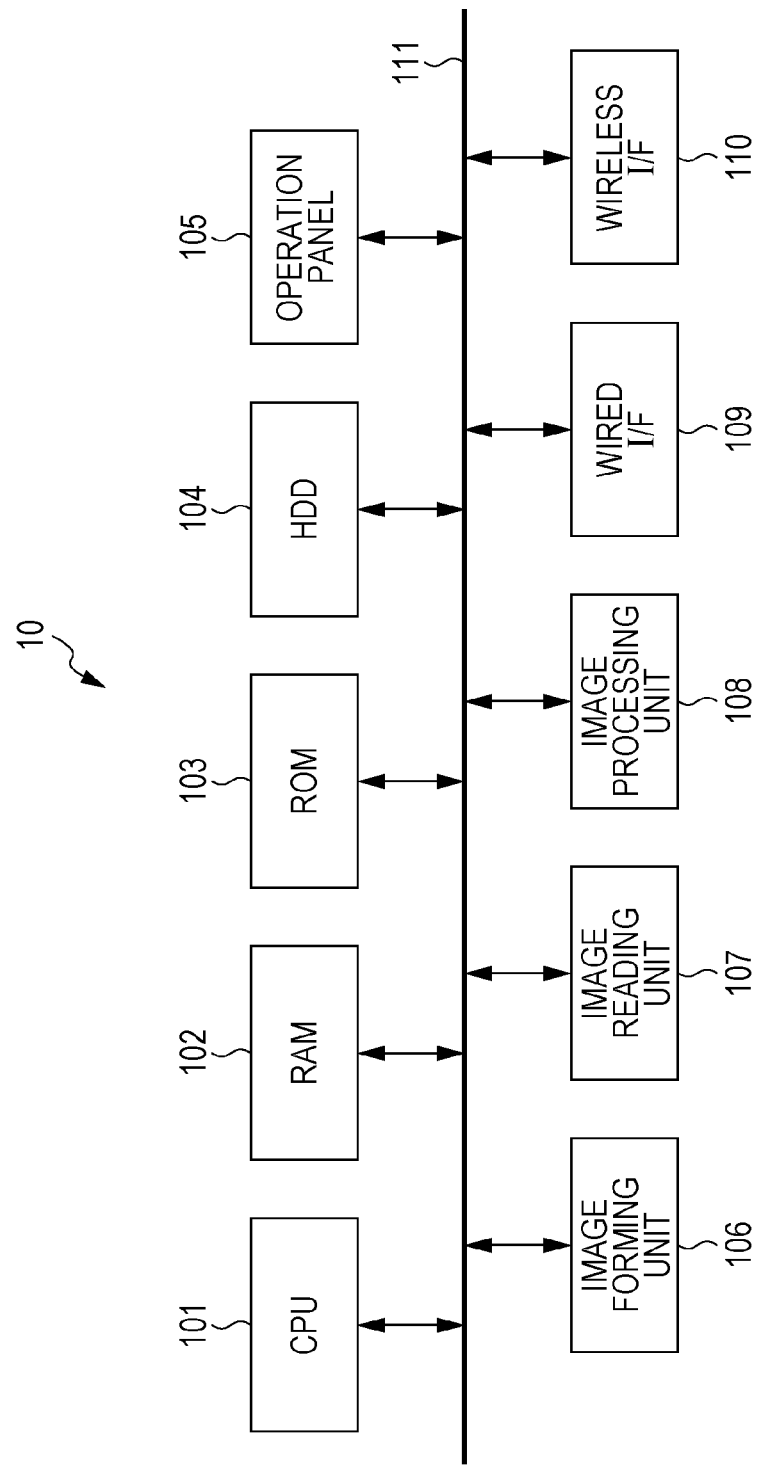
FIG. 2 is a diagram illustrating an example of the hardware configuration of an image forming apparatus.

Next, the hardware configuration of the image forming apparatus 10 will be described. FIG. 2 is a diagram illustrating an example of the hardware configuration of the image forming apparatus 10. As illustrated in FIG. 2, the image forming apparatus 10 includes a central processing unit (CPU) 101, a random access memory (RAM) 102, a read only memory (ROM) 103, a hard disk drive (HDD) 104, an operation panel 105, an image forming unit 106, an image reading unit 107, an image processing unit 108, a wired interface (hereinafter referred to as a wired I/F) 109, and a wireless interface (hereinafter referred to as a wireless I/F) 110. These functional units are connected to a bus 111, and transmit and receive data via the bus 111.

The CPU 101 executes various types of software, such as an operating system (OS) and applications. The RAM 102 is a memory that is used as a working memory or the like for the CPU 101. The ROM 103 is a memory that stores various programs executed by the CPU 101. The CPU 101 loads the various programs stored in the ROM 103 into the RAM 102 and executes the programs, so as to implement the individual functions of the image forming apparatus 10. The HDD 104 is a storage area that stores input data for the various types of software and output data from the various types of software.

The programs executed by the CPU 101 may be stored in advance in the ROM 103, or may be provided by being stored in a computer readable recording medium, such as a magnetic recording medium (magnetic tape, magnetic disk, or the like), an optical recording medium (optical disc or the like), a magneto-optical recording medium, or a semiconductor memory. Alternatively, the programs may be provided to the CPU 101 via the network 40.

The operation panel 105 is, for example, a touch panel, and displays various pieces of information and accepts an operation input from a user. Here, the operation panel 105 includes a display on which various pieces of information are displayed and a position detection sheet that detects a position touched by a finger or a stylus pen. Any device may be used for detecting a touched position, for example, a device for detecting a position on the basis of a pressure put by a touch, or a device for detecting a position on the basis of static electricity of a touched object. As an input unit, a keyboard or the like may be used instead of the touch panel.

The image forming unit 106 forms an image on a recording medium by using input image data. Here, the image forming unit 106 is a printer, for example. An electrophotographic system in which toner adhered to a photoconductor is transferred onto a recording medium to form an image, an inkjet system in which ink is ejected onto a recording medium to form an image, or the like may be used.

The image reading unit 107 reads an image recorded on a recording medium and generates image data representing the read image. Here, the image reading unit 107 is a scanner, for example. A charge-coupled device (CCD) system in which reflected light produced from light emitted from a light source and reflected by a document is reduced by a lens and received by a CCD, a contact image sensor (CIS) system in which reflected light produced from light emitted from an LED light source and reflected by a document is received by a CIS, or the like may be used.

The image processing unit 108 performs various image processing operations, such as color correction and gradation correction, on input image data. For example, the image processing unit 108 performs various image processing operations on image data read by the image reading unit 107 or image data stored in the HDD 104 and outputs the processed image data to the image forming unit 106.

The wired I/F 109 functions as a communication interface that transmits various data to and receives various data from the wireless router 30 via the network 40.

The wireless I/F 110 includes an antenna for performing wireless communication based on Wi-Fi Direct with the mobile terminal 20, and functions as a communication interface that transmits various data to and receives various data from the mobile terminal 20.

Hardware Configuration of Mobile Terminal

Figure 3:
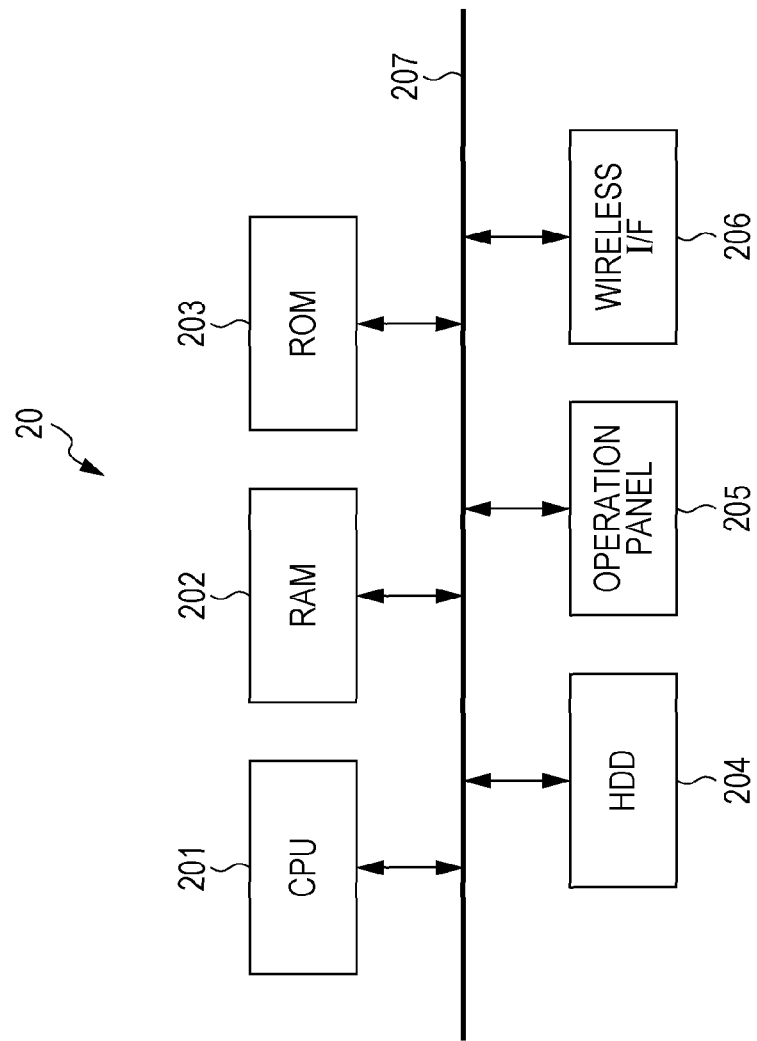
FIG. 3 is a diagram illustrating an example of the hardware configuration of a mobile terminal.

Next, the hardware configuration of the mobile terminal 20 will be described. FIG. 3 is a diagram illustrating an example of the hardware configuration of the mobile terminal 20. As illustrated in FIG. 3, the mobile terminal 20 includes a CPU 201, a RAM 202, a ROM 203, an HDD 204, an operation panel 205, and a wireless I/F 206. These functional units are connected to a bus 207, and transmit and receive data via the bus 207.

The CPU 201 executes various types of software, such as an OS and applications. The RAM 202 is a memory that is used as a working memory or the like for the CPU 201. The ROM 203 is a memory that stores various programs executed by the CPU 201. The CPU 201 loads the various programs stored in the ROM 203 into the RAM 202 and executes the programs, so as to implement the individual functions of the mobile terminal 20. The HDD 204 is a storage area that stores input data for the various types of software and output data from the various types of software.

The programs executed by the CPU 201 may be stored in advance in the ROM 203, or may be provided by being stored in a computer readable recording medium, such as a magnetic recording medium (magnetic tape, magnetic disk, or the like), an optical recording medium (optical disc or the like), a magneto-optical recording medium, or a semiconductor memory. Alternatively, the programs may be provided to the CPU 201 via the Internet or the like. Further, in a case where the mobile terminal 20 is a smartphone or a mobile phone, a flash storage may be used instead of the HDD 204.

The operation panel 205 is, for example, a touch panel, and displays various pieces of information and accepts an operation input from a user. Here, the operation panel 205 includes a display on which various pieces of information are displayed and a position detection sheet that detects a position touched by a finger or a stylus pen. Any device may be used for detecting a touched position, for example, a device for detecting a position on the basis of a pressure put by a touch, or a device for detecting a position on the basis of static electricity of a touched object. As an input unit, a keyboard or the like may be used instead of the touch panel.

The wireless I/F 206 functions as a communication interface that transmits various data to and receives various data from the wireless router 30 through wireless communication by establishing a Wi-Fi connection. The wireless I/F 206 includes an antenna for wirelessly communicating with the image forming apparatus 10 by Wi-Fi Direct, and functions as a communication interface that transmits various data to and receives various data from the image forming apparatus 10 through wireless communication by establishing a Wi-Fi Direct connection.

Functional Configuration of Mobile Terminal

Figure 4:
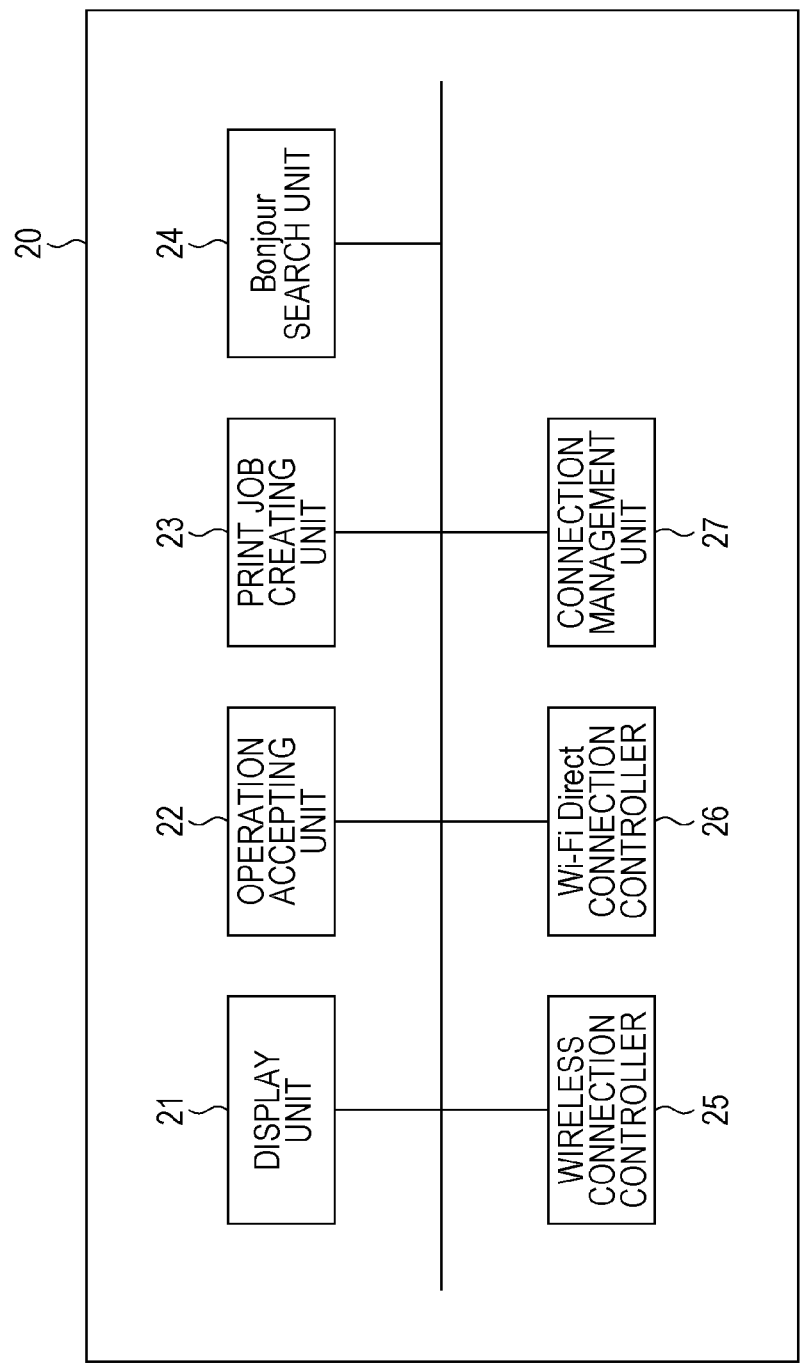
FIG. 4 is a block diagram illustrating an example of the functional configuration of the mobile terminal.

Next, the functional configuration of the mobile terminal 20 will be described. FIG. 4 is a block diagram illustrating an example of the functional configuration of the mobile terminal 20. The mobile terminal 20 includes a display unit 21 that displays various screens, an operation accepting unit 22 that accepts an operation input of a user, a print job creating unit 23 that creates a print job, and a Bonjour search unit 24 that executes a Bonjour search to detect an available image forming apparatus 10. The mobile terminal 20 also includes a wireless connection controller 25 that controls a Wi-Fi connection, a Wi-Fi Direct connection controller 26 that controls a Wi-Fi Direct connection, and a connection management unit 27 that manages a Wi-Fi connection and a Wi-Fi Direct connection established by the mobile terminal 20.

The display unit 21 corresponds to, for example, the operation panel 205, and displays various screens for the user. In the exemplary embodiment, the display unit 21 is used as an example of a display.

The operation accepting unit 22 accepts an operation input of a user, which is generated by a user's touch of the operation panel 205. For example, when the user selects a button for printing a document file, the operation accepting unit 22 accepts an operation input for starting printing of the document file. Also, for example, the user may cause the mobile terminal 20 to display a list of available image forming apparatuses 10 and select an image forming apparatus 10 to be used from the list to perform printing. To display a list of available image forming apparatuses 10, the image forming apparatuses 10 are searched for. In such a case, for example, when the user selects a button for searching for the image forming apparatuses 10, the operation accepting unit 22 accepts an operation input for searching for the image forming apparatuses 10.

In a case where the operation accepting unit 22 accepts an operation input for starting printing of a document file, the print job creating unit 23 creates a print job on the basis of image data of the document file.

The Bonjour search unit 24 executes a Bonjour search, and detects one or more image forming apparatuses 10 that are connected to the mobile terminal 20 via the wireless router 30 and the network 40 and that are available to the mobile terminal 20. In the exemplary embodiment, the Bonjour search unit 24 is used as an example of a first search unit.

The wireless connection controller 25 controls a Wi-Fi connection established between the mobile terminal 20 and the wireless router 30. Here, the wireless connection controller 25 establishes a Wi-Fi connection to the wireless router 30 by using wireless information about the wireless router 30 input by the user. With the Wi-Fi connection to the wireless router 30 being established, a connection between the mobile terminal 20 and the image forming apparatus 10 is established via the wireless router 30 and the network 40. When the user selects printing with an image forming apparatus 10 detected thorough a Bonjour search, the wireless connection controller 25 transmits a print job to the selected image forming apparatus 10 through wireless communication. The print job is transmitted to the destination image forming apparatus 10 via the wireless router 30 and the network 40. In the exemplary embodiment, the wireless connection controller 25 is used as an example of a first connection unit and a print instruction unit.

The Wi-Fi Direct connection controller 26 controls a Wi-Fi Direct connection established between the mobile terminal 20 and the image forming apparatus 10. Here, the Wi-Fi Direct connection controller 26 executes a neighbor search and detects one or more image forming apparatuses 10 existing within the range of radio waves. Also, the Wi-Fi Direct connection controller 26 makes a request for a Wi-Fi Direct connection to an image forming apparatus 10 detected through the neighbor search and performs processing of establishing a Wi-Fi Direct connection.

Further, when the user selects printing with the image forming apparatus 10 connected by Wi-Fi Direct, the Wi-Fi Direct connection controller 26 transmits a print job to the selected image forming apparatus 10 through wireless communication. The print job is directly transmitted to the destination image forming apparatus 10 without involving the wireless router 30.

After the Wi-Fi Direct connection has been established between the mobile terminal 20 and the image forming apparatus 10, the user carrying the mobile terminal 20 may move and the image forming apparatus 10 may become out of the range of radio waves of the mobile terminal 20. In such as case, the Wi-Fi Direct connection that has been established may be disconnected. Thus, if the Wi-Fi Direct connection to the image forming apparatus 10 is disconnected at the time of transmitting a print job, the Wi-Fi Direct connection controller 26 performs again processing of establishing a Wi-Fi Direct connection. In the exemplary embodiment, the Wi-Fi Direct connection controller 26 is used as an example of a second search unit, a connection request unit, a second connection unit, and a print instruction unit.

The connection management unit 27 manages a Wi-Fi connection and a Wi-Fi Direct connection established by the mobile terminal 20. Here, in a case where the operation accepting unit 22 accepts an operation input for starting printing of a document file, the connection management unit 27 switches, in accordance with the connection state between the mobile terminal 20 and the image forming apparatus 10, between an instruction to perform printing using a Wi-Fi connection and an instruction to perform printing using a Wi-Fi Direct connection. Specifically, in a case where a Wi-Fi connection has been established by the wireless connection controller 25, the connection management unit 27 determines an image forming apparatus 10 that is predetermined as an output destination of a print job as an output destination of a print job.

On the other hand, in a case where a Wi-Fi connection has not been established, if a Wi-Fi Direct connection has been established by the Wi-Fi Direct connection controller 26, the connection management unit 27 determines the image forming apparatus 10 connected by Wi-Fi Direct as an output destination of a print job. Here, if an image forming apparatus 10 as an output destination of a print job is registered in advance, the connection management unit 27 may display, on the display unit 21, a screen for asking the user whether the output destination of the print job may be changed to the image forming apparatus 10 connected by Wi-Fi Direct.

In a case where the operation accepting unit 22 accepts an operation input for searching for an image forming apparatus 10, the connection management unit 27 switches between a Bonjour search and a neighbor search based on Wi-Fi Direct in accordance with the connection state between the mobile terminal 20 and the image forming apparatus 10. Specifically, in a case where a Wi-Fi connection has been established by the wireless connection controller 25, the connection management unit 27 instructs the Bonjour search unit 24 to execute a Bonjour search. On the other hand, in a case where a Wi-Fi connection has not been established, the connection management unit 27 instructs the Wi-Fi Direct connection controller 26 to execute a neighbor search. In the exemplary embodiment, the connection management unit 27 is used as an example of a search execution unit.

With a control program being executed by the CPU 201 in the mobile terminal 20, the functions of the print job creating unit 23, the Bonjour search unit 24, the wireless connection controller 25, the Wi-Fi Direct connection controller 26, and the connection management unit 27 are implemented. The functions of the display unit 21 and the operation accepting unit 22 are implemented by, for example, the operation panel 205.

Description of Processing Performed at Start of Printing

Figure 5:
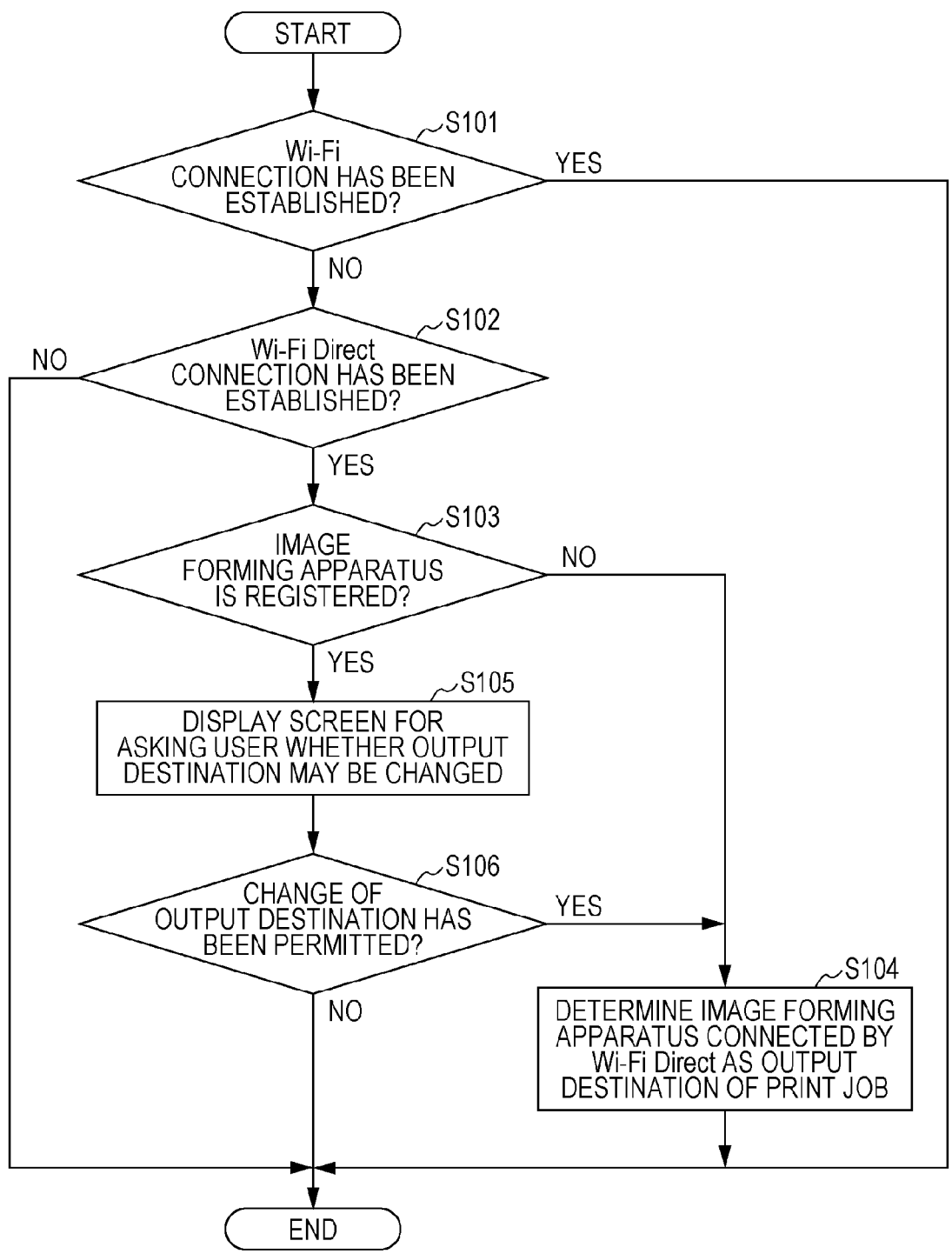
FIG. 5 is a flowchart illustrating an example of a processing procedure that is performed at the time of starting printing of a document file.

Next, a description will be given of a procedure of processing that is performed at the time of starting printing of a document file. FIG. 5 is a flowchart illustrating an example of a processing procedure that is performed at the time of starting printing of a document file.

First, the user performs an operation of printing a document file, and the operation accepting unit 22 accepts an operation input for starting printing of the document file. Accordingly, the connection management unit 27 determines whether or not a Wi-Fi connection has been established by the wireless connection controller 25 (step S101). If it is determined that a Wi-Fi connection has been established (YES in step S101), this processing flow ends. In this case, an image forming apparatus 10 that is registered in advance as an output destination of a print job is determined as the output destination of the print job. Subsequently, the wireless connection controller 25 transmits the print job to the image forming apparatus 10 determined as the output destination of the print job via the wireless router 30. If the image forming apparatus 10 is not registered in advance, the print job is not transmitted and an error occurs.

On the other hand, if it is determined in step S101 that a Wi-Fi connection has not been established (NO in step S101), the connection management unit 27 determines whether or not a Wi-Fi Direct connection has been established by the Wi-Fi Direct connection controller 26 (step S102). If it is determined that a Wi-Fi Direct connection has not been established (NO in step S102), this processing flow ends. In this case, neither a Wi-Fi connection nor a Wi-Fi Direct connection has been established, and thus the print job is not transmitted and an error occurs.

On the other hand, if it is determined in step S102 that a Wi-Fi Direct connection has been established (YES in step S102), the connection management unit 27 determines whether or not an image forming apparatus 10 is registered in advance as the output destination of the print job (step S103). If it is determined that an image forming apparatus 10 is not registered as the output destination of the print job (NO in step S103), the connection management unit 27 determines the image forming apparatus 10 connected by Wi-Fi Direct as the output destination of the print job (step S104). After that, this processing flow ends. Subsequently, the Wi-Fi Direct connection controller 26 transmits the print job to the image forming apparatus 10 determined as the output destination of the print job.

On the other hand, if it determined in step S103 that an image forming apparatus 10 is registered as the output destination of the print job (YES in step S103), the connection management unit 27 displays, on the display unit 21, a screen for asking the user whether the output destination of the print job may be changed from the registered image forming apparatus 10 to the image forming apparatus 10 connected by Wi-Fi Direct (step S105).

Subsequently, the connection management unit 27 determines whether or not change of the output destination to the image forming apparatus 10 connected by Wi-Fi Direct has been permitted (step S106). Here, if the operation accepting unit 22 accepts an operation input for permitting the change of the input destination to the image forming apparatus 10 connected by Wi-Fi Direct, a positive determination (YES) is made in step S106, and the processing proceeds to step S104. On the other hand, if the operation accepting unit 22 does not accept an operation input for permitting the change of the input destination to the image forming apparatus 10 connected by Wi-Fi Direct, a negative determination (NO) is made in step S106. In this case, the print job is not transmitted, and this processing flow ends.

As described above, in the case of printing a document file, the mobile terminal 20 transmits a print job to the image forming apparatus 10 connected by Wi-Fi connection or transmits the print job to the image forming apparatus 10 connected by Wi-Fi Direct connection in accordance with the connection state between the mobile terminal 20 and the image forming apparatus 10. For example, in the case of transmitting a print job to the image forming apparatus 10 registered in advance regardless of the connection state, printing is not performed if a Wi-Fi connection has not been established in some cases. On the other hand, the mobile terminal 20 according to the exemplary embodiment transmits a print job to the image forming apparatus 10 connected by Wi-Fi Direct if a Wi-Fi Direct connection has been established even if a Wi-Fi connection has not been established, and thus printing is performed.

The connection management unit 27 determines in step S103 whether or not an image forming apparatus 10 as the output destination of the print job is registered in advance, but such a determination is not necessarily performed. That is, in a case where a Wi-Fi connection has not been established and a Wi-Fi Direct connection has been established, the connection management unit 27 may determine the image forming apparatus 10 connected by Wi-Fi Direct as the output destination of the print job regardless of whether or not an image forming apparatus 10 is registered.

If it is determined in step S101 that a Wi-Fi connection has been established, the image forming apparatus 10 registered in advance as the output destination of the print job is determined as the output destination of the print job, but an exemplary embodiment of the present invention is not limited thereto. For example, if a Wi-Fi Direct connection has been further established, the connection management unit 27 may display, on the display unit 21, a screen that allows the user to select the image forming apparatus 10 registered in advance or the image forming apparatus 10 connected by Wi-Fi Direct, as the image forming apparatus 10 to be used for printing.

If it is determined in step S101 that a Wi-Fi connection has been established, an error occurs if there is not an image forming apparatus 10 registered in advance as the output destination of the print job. However, an exemplary embodiment of the present invention is not limited thereto. For example, if a Wi-Fi Direct connection has been further established, the connection management unit 27 may determine the image forming apparatus 10 connected by Wi-Fi Direct as the output destination of the print job, as in step S104.

The procedure illustrated in FIG. 5 has been described as a procedure of processing performed at the time of starting printing of a document file. The processing illustrated in FIG. 5 may be performed when a print application is activated. In this case, for example, the print application is activated, and then the image forming apparatus 10 as the output destination of the print job is determined through the processing illustrated in FIG. 5. After that, when the user performs an operation of printing the document file, the print job is actually transmitted to the image forming apparatus 10.

Example of Screens Displayed on Mobile Terminal

Figure 6A:
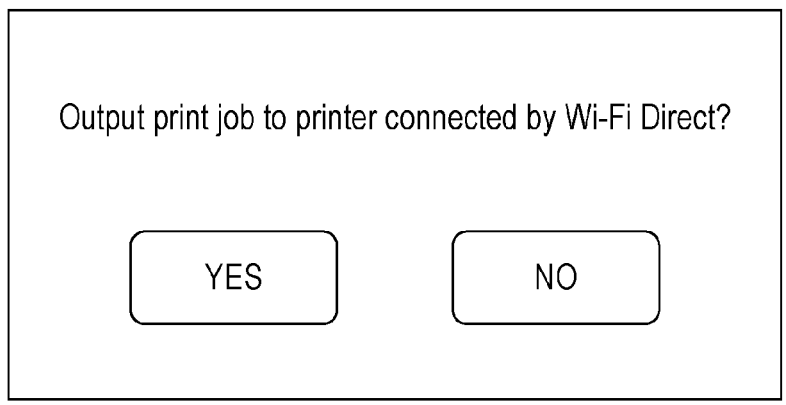
FIGS. 6A and 6B are diagrams illustrating an example of screens that allow a user to select an image forming apparatus.
Figure 6B:
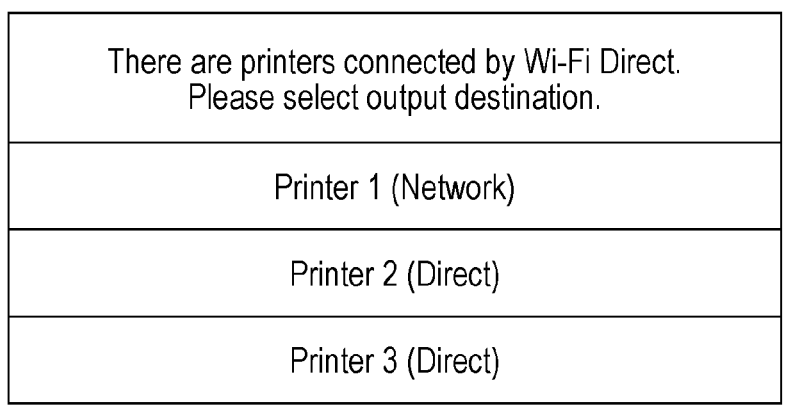

Next, a description will be given of screens that are displayed on the display unit 21 of the mobile terminal 20 when the user selects an image forming apparatus 10 as an output destination of a print job. FIGS. 6A and 6B are diagrams illustrating an example of screens that are used by the user to select an image forming apparatus 10.

The screen illustrated in FIG. 6A is an example of a screen that is displayed for asking the user whether the output destination of the print job may be changed to the image forming apparatus 10 connected by Wi-Fi Direct in step S105 in FIG. 5.

On the screen illustrated in FIG. 6A, a message "Output print job to printer connected by Wi-Fi Direct?" is displayed. If the user selects "YES", an operation input for permitting change of the output destination is performed. That is, a positive determination (YES) is made in step S106 in FIG. 5. On the other hand, if the user selects "NO", an operation input for not permitting change of the output destination is performed. That is, a negative determination (NO) is made in step S106 in FIG. 5.

The screen illustrated in FIG. 6B is an example of a screen that is displayed for allowing the user to select the image forming apparatus 10 registered in advance or the image forming apparatus 10 connected by Wi-Fi Direct as an image forming apparatus 10 to be used for printing in a case where a positive determination (YES) is made in step S101 in FIG. 5 and a Wi-Fi Direct connection has been established.

On the screen illustrated in FIG. 6B, three image forming apparatuses 10, that is, "printer 1", "printer 2", and "printer 3", are displayed. Also, a message "There are printers connected by Wi-Fi Direct." is displayed, which indicates that there are image forming apparatuses 10 connected by Wi-Fi Direct.

"Printer 1" is connected through "Network", and is an image forming apparatus 10 connected by a Wi-Fi connection. In the example illustrated in FIG. 6B, "printer 1" is an image forming apparatus 10 registered in advance as the output destination of the print job. "Printer 2" and "printer 3" are connected by "Direct", and are image forming apparatuses 10 for which a Wi-Fi Direct connection to the mobile terminal 20 has been established.

For example, if the user selects "printer 1", "printer 1" becomes the output destination of the print job, and the wireless connection controller 25 transmits the print job to "printer 1" via the wireless router 30. If the user selects "printer 2", "printer 2" becomes the output destination of the print job, and the Wi-Fi Direct connection controller 26 directly transmits the print job to "printer 2". Here, in a case where the Wi-Fi Direct connection between the mobile terminal 20 and "printer 2" is disconnected, reconnection processing is performed and then the print job is transmitted.

Description of Processing Performed to Search for Image Forming Apparatus

Figure 7:
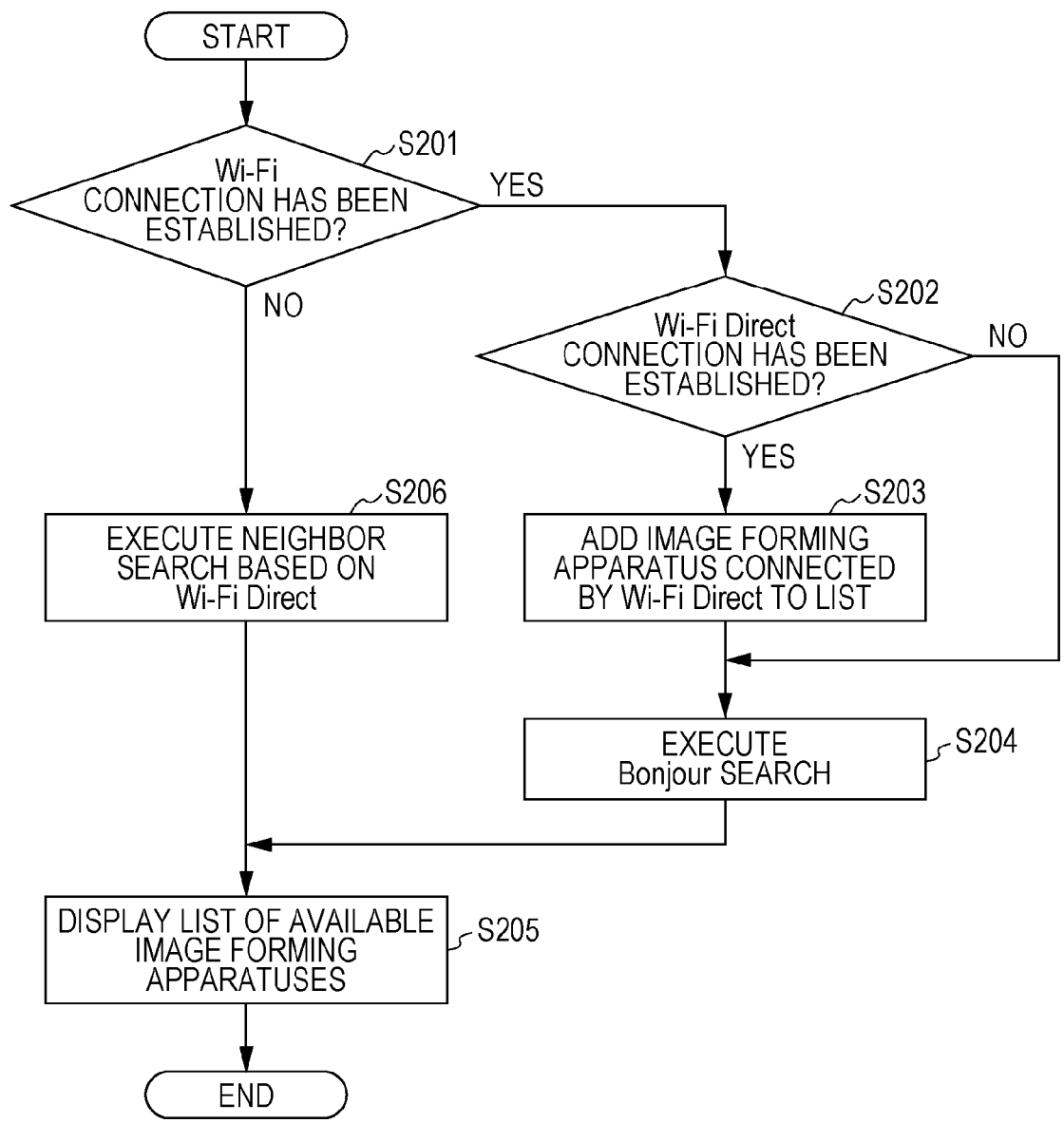
FIG. 7 is a flowchart illustrating an example of a processing procedure that is performed to search for an image forming apparatus.

Next, a description will be given of a procedure of processing that is performed to search for an image forming apparatus 10. FIG. 7 is a flowchart illustrating an example of a processing procedure that is performed to search for an image forming apparatus 10.

First, a print application is activated, the user performs an operation of searching for an image forming apparatus 10, and the operation accepting unit 22 accepts an operation input for searching for an image forming apparatus 10. Accordingly, the connection management unit 27 determines whether or not a Wi-Fi connection has been established by the wireless connection controller 25 (step S201). If it is determined that a Wi-Fi connection has been established (YES in step S201), the connection management unit 27 determines whether or not a Wi-Fi Direct connection has been established by the Wi-Fi Direct connection controller 26 (step S202).

If it is determined that a Wi-Fi Direct connection has been established (YES in step S202), the connection management unit 27 adds the image forming apparatus 10 connected by Wi-Fi Direct to a list of available image forming apparatuses (step S203). On the other hand, if it is determined in step S202 that a Wi-Fi Direct connection has not been established (NO in step S202), no apparatus is added to the list. Subsequently, the connection management unit 27 instructs the Bonjour search unit 24 to execute a Bonjour search. The Bonjour search unit 24 executes a Bonjour search and detects one or more image forming apparatuses 10 capable of performing communication via the wireless router 30 (step S204).

Subsequently, the connection management unit 27 displays, as a list of available image forming apparatuses, information representing the image forming apparatus 10 connected by Wi-Fi Direct and added in step S203, and the image forming apparatus 10 detected through the Bonjour search in step S204, on the display unit 21 (step S205). After that, this processing flow ends.

On the other hand, if it is determined in step S201 that a Wi-Fi connection has not been established (NO in step S201), the connection management unit 27 instructs the Wi-Fi Direct connection controller 26 to execute a neighbor search. Accordingly, the Wi-Fi Direct connection controller 26 executes a neighbor search based on Wi-Fi direct and detects one or more image forming apparatuses 10 (step S206). Subsequently, the processing proceeds to step S205. Here, a list of the one or more image forming apparatuses 10 detected through the neighbor search is displayed on the display unit 21. After that, this processing flow ends.

In this way, to search for an image forming apparatus 10, the mobile terminal 20 executes a Bonjour search or a neighbor search based on Wi-Fi Direct in accordance with the connection state between the mobile terminal 20 and the image forming apparatus 10. That is, if a Wi-Fi connection has been established in the case of searching for an image forming apparatus 10, the mobile terminal 20 executes a Bonjour search and detects one or more image forming apparatuses 10 capable of performing communication via the wireless router 30. The mobile terminal 20 then displays a list of the one or more detected image forming apparatuses 10. At this time, the mobile terminal 20 also displays information representing an image forming apparatus 10 connected by Wi-Fi Direct. On the other hand, if a Wi-Fi connection has not been established in the case of searching for an image forming apparatus 10, the mobile terminal 20 executes a neighbor search based on Wi-Fi Direct, and displays a list of one or more detected image forming apparatuses 10.

In step S204, the Wi-Fi Direct connection controller 26 may execute a neighbor search based on Wi-Fi Direct in addition to a Bonjour search. In this case, information representing one or more image forming apparatuses 10 detected through the neighbor search is also displayed in step S205.

Further, in a case where an image forming apparatus 10 is not detected in a certain time period when a Bonjour search is executed in step S204, the Wi-Fi Direct connection controller 26 may execute a neighbor search based on Wi-Fi Direct.

In a case where both a Bonjour search and a neighbor search are executed, the same image forming apparatus 10 may be detected through both the searches. However, in the case of newly establishing a Wi-Fi Direct connection to the image forming apparatus 10 detected through the neighbor search, it is necessary to perform a user operation therefor. On the other hand, the image forming apparatus 10 detected through the Bonjour search is capable of communicating with the mobile terminal 20 without a new user operation. Thus, in a case where the same image forming apparatus 10 is detected through both the Bonjour search and neighbor search, the mobile terminal 20 may preferentially display information representing the image forming apparatus 10 detected through the Bonjour search on the display unit 21.

For example, the mobile terminal 20 displays, on the display unit 21, only information representing the image forming apparatus 10 detected through the Bonjour search among the image forming apparatuses 10 detected through both the searches, and does not display information representing the image forming apparatus 10 detected through the neighbor search based on Wi-Fi Direct. Also, for example, the mobile terminal 20 may attach a mark representing a priority to information representing the image forming apparatus 10 detected through the Bonjour search among the image forming apparatuses 10 detected through both the searches.

In a case where the same image forming apparatus 10 is detected through both the searches, if the image forming apparatus 10 detected through the neighbor search is selected by the user as an output destination of a print job, the mobile terminal 20 may display a screen for asking the user whether or not to use the image forming apparatus 10 detected through the Bonjour search.

In a case where a search for an image forming apparatus 10 is executed in the procedure illustrated in FIG. 7, the mobile terminal 20 displays the screen illustrated in FIG. 6B as a list of available image forming apparatuses 10. On the screen that is displayed, information representing the image forming apparatus 10 detected through the Bonjour search and information representing the image forming apparatus 10 detected through the neighbor search are distinctively displayed. The image forming apparatus 10 detected through the neighbor search may have been connected or have not been connected by Wi-Fi Direct. Thus, the mobile terminal 20 may also display information indicating whether the image forming apparatus 10 has been connected or has not been connected by Wi-Fi Direct.

Description of Processing Performed to Select Image Forming Apparatus

Figure 8:
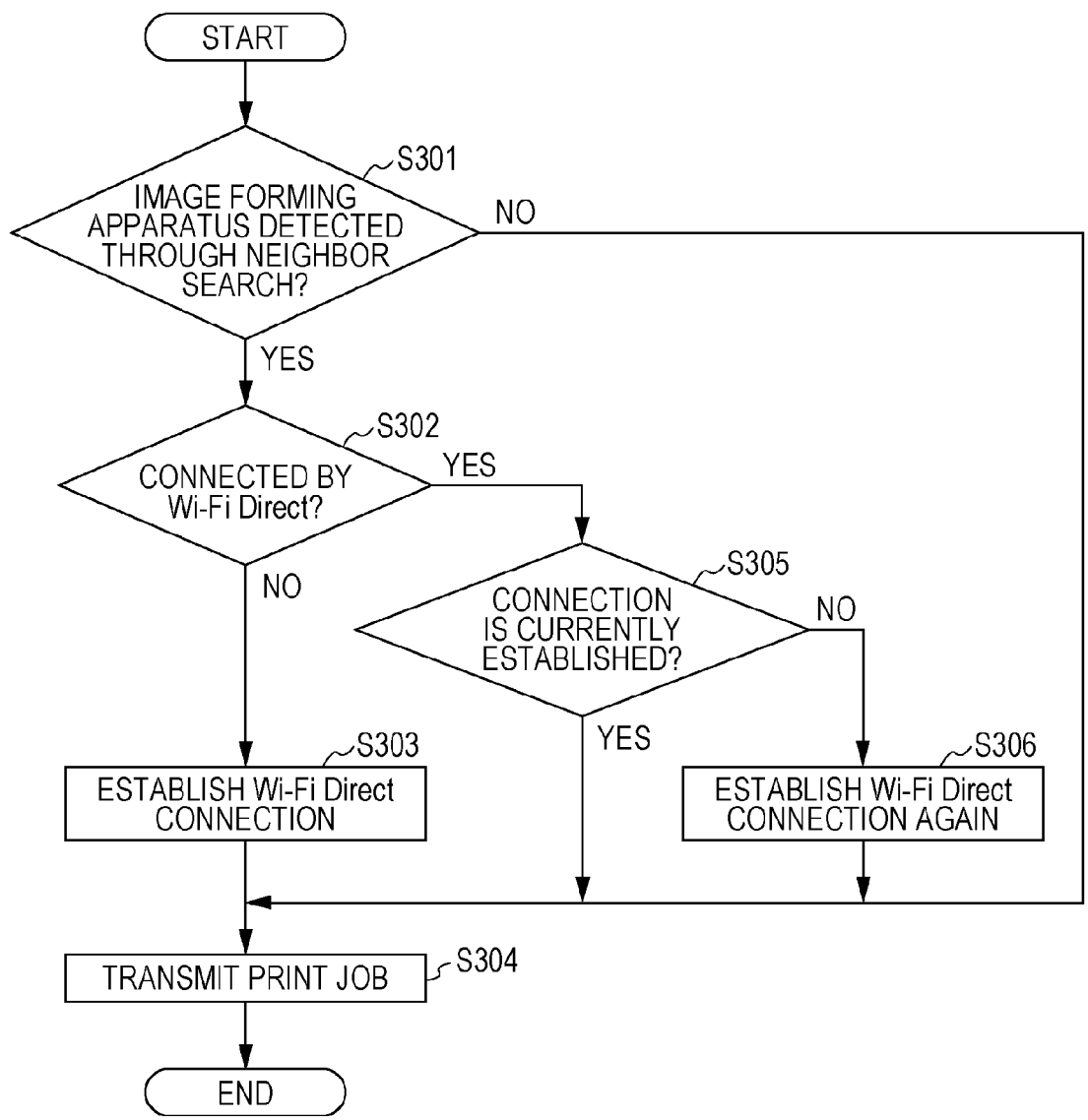
FIG. 8 is a flowchart illustrating an example of a processing procedure that is performed to select an image forming apparatus.

Next, a description will be given of processing that is performed to select an image forming apparatus 10 to be used by the user from among the image forming apparatuses 10 displayed on a list. FIG. 8 is a flowchart illustrating an example of a processing procedure that is performed to select an image forming apparatus 10. It is assumed that, in an initial state, the search processing illustrated in FIG. 7 has been performed and a list of available image forming apparatuses 10 is displayed on the display unit 21.

First, the user selects an image forming apparatus 10 from the displayed list, and then the connection management unit 27 determines whether or not the selected image forming apparatus 10 is an image forming apparatus 10 detected through a neighbor search (step S301). If it is determined that the selected image forming apparatus 10 is an image forming apparatus 10 detected through a neighbor search (YES in step S301), the connection management unit 27 determines whether or not the selected image forming apparatus 10 has been connected by Wi-Fi Direct (step S302). If it is determined that the image forming apparatus 10 has not yet been connected (NO in step S302), the connection management unit 27 instructs the Wi-Fi Direct connection controller 26 to establish a Wi-Fi Direct connection.

Subsequently, the Wi-Fi Direct connection controller 26 establishes a Wi-Fi Direct connection to the image forming apparatus 10 selected by the user (step S303). Subsequently, the Wi-Fi Direct connection controller 26 transmits a print job to the image forming apparatus 10 (step S304), and this processing flow ends. The transmitted print job is directly transmitted to the image forming apparatus 10 without involving the wireless router 30. Subsequently, printing is performed by the image forming apparatus 10.

On the other hand, if it is determined in step S302 that the selected image forming apparatus 10 has been connected (YES in step S302), the connection management unit 27 determines whether or not the connection is currently established by the Wi-Fi Direct connection controller 26 (step S305). If it is determined that the connection is currently established (YES in step S305), the processing proceeds to step S304. On the other hand, if it is determined that the connection has been disconnected (NO in step S305), the Wi-Fi Direct connection controller 26 makes a connection request to establish a Wi-Fi Direct connection again (step S306). After that, the processing proceeds to step S304.

If it is determined in step S301 that the selected image forming apparatus 10 is not an image forming apparatus 10 detected through the neighbor search (NO in step S301), the selected image forming apparatus 10 is an image forming apparatus 10 detected through the Bonjour search. In this case, it is not necessary to newly establish a connection, and thus the processing proceeds to step S304. Here, the wireless connection controller 25 transmits the print job to the image forming apparatus 10 selected by the user by Wi-Fi connection via the wireless router 30.

In this way, in a case where an image forming apparatus 10 detected through a neighbor search is selected as the output destination of the print job, the mobile terminal 20 determines whether or not the image forming apparatus 10 has been connected by Wi-Fi Direct. If a Wi-Fi Direct connection has not been established, the mobile terminal 20 establishes a Wi-Fi Direct connection to the selected image forming apparatus 10. Even if a Wi-Fi Direct connection is once established, if the Wi-Fi Direct connection is disconnected thereafter, the mobile terminal 20 establishes a Wi-Fi Direct connection again.

If it is determined in step S302 that a Wi-Fi Direct connection has not been established (NO in step S302), the connection management unit 27 may display an operation guide for establishing a Wi-Fi Direct connection on the display unit 21. In this case, the user may perform an operation for establishing a Wi-Fi Direct connection in accordance with the displayed operation guide. The operation guide may be displayed on the screen of the operation panel 105 of the image forming apparatus 10, that is, the operation guide may be displayed on at least either of the mobile terminal 20 and the image forming apparatus 10.

Further, the connection management unit 27 may switch the operation guide to be displayed in accordance with the setting of the image forming apparatus 10 selected by the user. A PIN code scheme or a push button scheme may be used as a procedure for establishing a Wi-Fi Direct connection, as described above. The scheme to be used for establishing a connection is preset in the image forming apparatus 10 to be connected. Thus, for example, in a case where a setting is made to use the PIN code scheme in the image forming apparatus 10, the connection management unit 27 displays, as an operation guide, a procedure based on the PIN code scheme on the display unit 21.

As described above, the mobile terminal 20 according to the exemplary embodiment switches a method for searching for an image forming apparatus 10 and an image forming apparatus 10 to be used as an output destination of a print job in accordance with the connection state between the mobile terminal 20 and the image forming apparatus 10. As a result of switching a search method in accordance with the connection state between the mobile terminal 20 and the image forming apparatus 10, printing may be performed by the image forming apparatus 10 that is detectable through a neighbor search based on Wi-Fi Direct and that is not detectable through a Bonjour search, compared to a configuration in which only a Bonjour search is used regardless of a connection state. Also, as a result of switching an image forming apparatus 10 to be used as an output destination of a print job in accordance with the connection state between the mobile terminal 20 and the image forming apparatus 10, printing may be performed by an image forming apparatus 10 that has been connected, compared to a configuration in which a print job is transmitted to an image forming apparatus 10 registered in advance regardless of a connection state.

The processing performed by the mobile terminal 20 according to the exemplary embodiment described above is prepared as a program, such as application software, for instructing the image forming apparatus 10 to print a document.

Therefore, the processing performed by the mobile terminal 20 may be regarded as a program causing a computer to implement a first search function of searching for an image forming apparatus that is connected to a mobile terminal via a relay device for wireless connection; a second search function of searching for an image forming apparatus that is wirelessly connectable to the mobile terminal without involving the relay device; and a search execution function of executing a search using at least the first search function among the first search function and the second search function in a case where the mobile terminal and the relay device are wirelessly connected to each other, and executing a search using the second search function in a case where the mobile terminal and the relay device are not wirelessly connected to each other, in order to search for an image forming apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for searching for an image forming apparatus, including
   a first search method configured to search for an image forming apparatus that is connected to a mobile terminal via a relay device for wireless connection, the first search method being executed by at least one hardware processor, and
   a second search method configured to search for an image forming apparatus that is wirelessly connectable to the mobile terminal without involving the relay device, the second search method being executed by the at least one hardware processor,
   the method comprising:
   in response to the mobile terminal and the relay device being wirelessly connected to each other, executing a search using at least the first search method among the first search method and the second search method, using the at least one hardware processor, in order to search for the image forming apparatus; and
   in response to the mobile terminal and the relay device not being wirelessly connected to each other, executing a search using the second search method, using the at least one hardware processor, in order to search for the image forming apparatus,
   wherein the second search method is configured to function in a case in which a Wi-Fi connection has not been established.

2. The method according to claim 1, further comprising:
   in response to the mobile terminal and the relay device being wirelessly connected to each other and in response to the image forming apparatus not being detected in a certain time period from starting of a search using the first search method, executing a search using the second search method.

3. The method according to claim 1, further comprising:
   in response to both the first search method and the second search method being executed and in response to an image forming apparatus detected through the first search method being identical to an image forming apparatus detected through the second search method, preferentially displaying information representing the image forming apparatus detected through the first search method on a display of the mobile terminal.

4. The method according to claim 1, further comprising:
   in response to an image forming apparatus detected through the second search method being selected by an operator, displaying details of an operation for establishing a connection between the mobile terminal and the selected image forming apparatus on at least either of a display of the mobile terminal or a display of the image forming apparatus.

5. The method according to claim 1, wherein the relay device is a router.

6. A mobile terminal comprising:
   a first searcher configured to search for an image forming apparatus that is connected to the mobile terminal via a relay device for wireless connection;
   a second searcher configured to search for an image forming apparatus that is wirelessly connectable to the mobile terminal without involving the relay device; and
   a search executor configured to execute a search using at least the first searcher among the first searcher and the second searcher in response to the mobile terminal and the relay device being wirelessly connected to each other, and configured to execute a search using the second searcher in response to the mobile terminal and the relay device not being wirelessly connected to each other, in order to search for the image forming apparatus,
   wherein the second searcher is configured to function in a case in which the mobile terminal has not established a Wi-Fi connection.

7. The mobile terminal according to claim 6, further comprising:
   a display configured to distinctively display, on a screen, information representing an image forming apparatus detected through a search using the first searcher and information representing an image forming apparatus detected through a search using the second searcher unit.

8. The mobile terminal according to claim 6, further comprising:
   a connection requestor configured to, after a connection between the mobile terminal and an image forming apparatus detected by the second search unit is established, in response to the connection between the mobile terminal and the image forming apparatus being disconnected when the mobile terminal provides a print instruction to the image forming apparatus, make a connection request to the image forming apparatus.

9. A mobile terminal comprising:
   a first connector configured to establish a first connection to an image forming apparatus via a relay device for wireless connection;
   a second connector configured to establish a second connection to an image forming apparatus without involving the relay device for wireless connection; and
   a print instructor configured to provide a print instruction to an image forming apparatus connected by the second connection in response to the first connection not having been established and the second connection having been established when a printing operation is performed by an operator,
   wherein the second connector is configured to function in a case in which a Wi-Fi connection has not been established.

10. The mobile terminal according to claim 9, wherein, in response to the first connection having been established when the printing operation is performed by the operator, the print instructor is configured to provide, via the relay device, a print instruction to an image forming apparatus that is predetermined as an output destination of the print instruction.

11. The mobile terminal according to claim 9, wherein, in response to the first connection not having been established and the second connection having been established when the printing operation is performed by the operator, the print instructor is configured to provide a print instruction to an image forming apparatus connected by the second connection even in response to an image forming apparatus as an output destination of the print instruction being predetermined.

12. The mobile terminal according to claim 9, wherein, in response to both the first connection and the second connection having been established when the printing operation is performed by the operator and in response to an image forming apparatus as an output destination of a print instruction not being predetermined, the print instructor is configured to provide the print instruction to an image forming apparatus connected by the second connection.

13. A non-transitory computer readable medium storing a program causing a computer to implement:
- a first search function of searching for an image forming apparatus that is connected to a mobile terminal via a relay device for wireless connection;
- a second search function of searching for an image forming apparatus that is wirelessly connectable to the mobile terminal without involving the relay device; and
- a search execution function of executing a search using at least the first search function among the first search function and the second search function in response to the mobile terminal and the relay device being wirelessly connected to each other, and executing a search using the second search function in response to the mobile terminal and the relay device not being wirelessly connected to each other, in order to search for the image forming apparatus
- wherein the second search function is configured to function in a case in which a Wi-Fi connection has not been established.

\* \* \* \* \*